United States Patent [19]

Helmrich et al.

[11] 4,079,109

[45] Mar. 14, 1978

[54] METHOD OF MAKING CARBON ELECTRODES

[75] Inventors: Günter Helmrich, Grevenbroich, NrH; Fritz Wülfing, Rheydt, both of Germany

[73] Assignee: Vereinigte Aluminium-Werke Aktiengesellschaft, Bonn, Germany

[21] Appl. No.: 669,652

[22] Filed: Mar. 23, 1976

Related U.S. Application Data

[63] Continuation-in-part of Ser. No. 854,184, Aug. 29, 1969, which is a continuation of Ser. No. 234,783, Mar. 16, 1972, abandoned.

[51] Int. Cl.[2] .......................... B29C 3/00; B29G 1/00

[52] U.S. Cl. .................................................. 264/72

[58] Field of Search .................................. 264/69–72, 264/120, 126

[56] References Cited

U.S. PATENT DOCUMENTS

| | | | |
|---|---|---|---|
| 2,407,168 | 9/1946 | Lindkvist | 425/456 |
| 3,052,594 | 7/1962 | Hauth | 264/69 |
| 3,448,181 | 6/1969 | Olstowski et al. | 264/120 |
| 3,470,279 | 9/1969 | Abbott | 264/72 |

*Primary Examiner*—Willard E. Hoag
*Attorney, Agent, or Firm*—Darby & Darby

[57] ABSTRACT

A method for producing coherent shaped bodies from granular material. The granular material is confined in a mold and the mold is subjected to vibratory motions requisite for compacting the granular material. The frequency of the vibratory motions is continuously increased until compaction is achieved.

6 Claims, 4 Drawing Figures

METHOD OF MAKING CARBON ELECTRODES

CROSS REFERENCE TO RELATED APPLICATIONS

The present application is a continuation-in-part of application Ser. No. 854,184, filed on Aug. 29, 1969 and a continuation of application Ser. No. 234,783, filed Mar. 16, 1972 and now abandoned.

BACKGROUND OF THE INVENTION

The present invention relates generally to the shaping or compacting of granular masses, and more particularly to a method of producing coherent bodies from granular masses by subjecting the same to vibratory stresses requisite for compacting the granular masses into a coherent body.

There are many applications where it is necessary to compact granular materials into a coherent body of predetermined shape, the body being required to have certain characteristics, namely homogeneity and uniform density. It is possible in this manner to produce rather large bodies, and the invention is in particular concerned with the production of electrodes such as are, for instance, used in the smelting of aluminum. Such electrodes may reach weights of 1 ton or more and must have certain well-defined characteristics.

The materials of which these electrodes are made are of sand-like granular consistency and of a viscous flowable character; they do not, however, have a plastic character. Such materials are for instance discussed in U.S. Pat. No. 3,526,686 which is also concerned with the production of smelting electrodes.

To produce coherent shaped bodies, that is for instance electrodes, from such granular materials or masses is already known, for instance from the aforementioned U.S. Patent. It is proposed to confine a quantity of the granular mass in a mold which is supported on a vibratory platform and to vibrate the platform and thereby the mold to the extent requisite for obtaining the compaction necessary to transform the granular mass into a coherent body. A weight member is introduced through an open top of the mold and so that it rests on the granular mass accommodated in the mold in order to provide pressure upon the granular mass while the same is subjected to vibration. This vibration may be transmitted to the mold by rotating imbalanced masses.

SUMMARY OF THE INVENTION

It is a general object of the present invention to further improve the method known from the prior art for producing coherent bodies by compacting granular masses through subjecting them to vibratory stresses.

It is a more particular object of the present invention to provide an improved method of this type which will result in the production of such shaped coherent bodies which have a greater density and better homogeneity than was heretofore possible.

In pursuance of these objects and others which will become apparent hereafter, one feature of the invention resides in a method for producing coherent bodies by confining granular material in a mold and subjecting the same to vibrations requisite for compacting the granular material into a coherent body. The method according to the present invention consists of the steps of providing a vibratory-compacting device including a mold suspended for vibratory movement, confining a mass of granular material in the mold, transmitting to the mold vibratory stresses requisite for progressively compacting the granular material into a coherent body and the final step of continuously increasing the frequency of vibration transmitted to the mold during progressing compaction of the material so as to thereby produce from the material a coherent body having improved density and homogeneity.

The frequency of vibration is so adjusted that on the one hand it is accommodated to the weight of the body which is being produced from the confined granular mass, and on the other hand, it is accommodated to the resonance characteristics of the granular mass, which characteristics vary as the granular mass becomes compacted and transformed into a coherent body.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
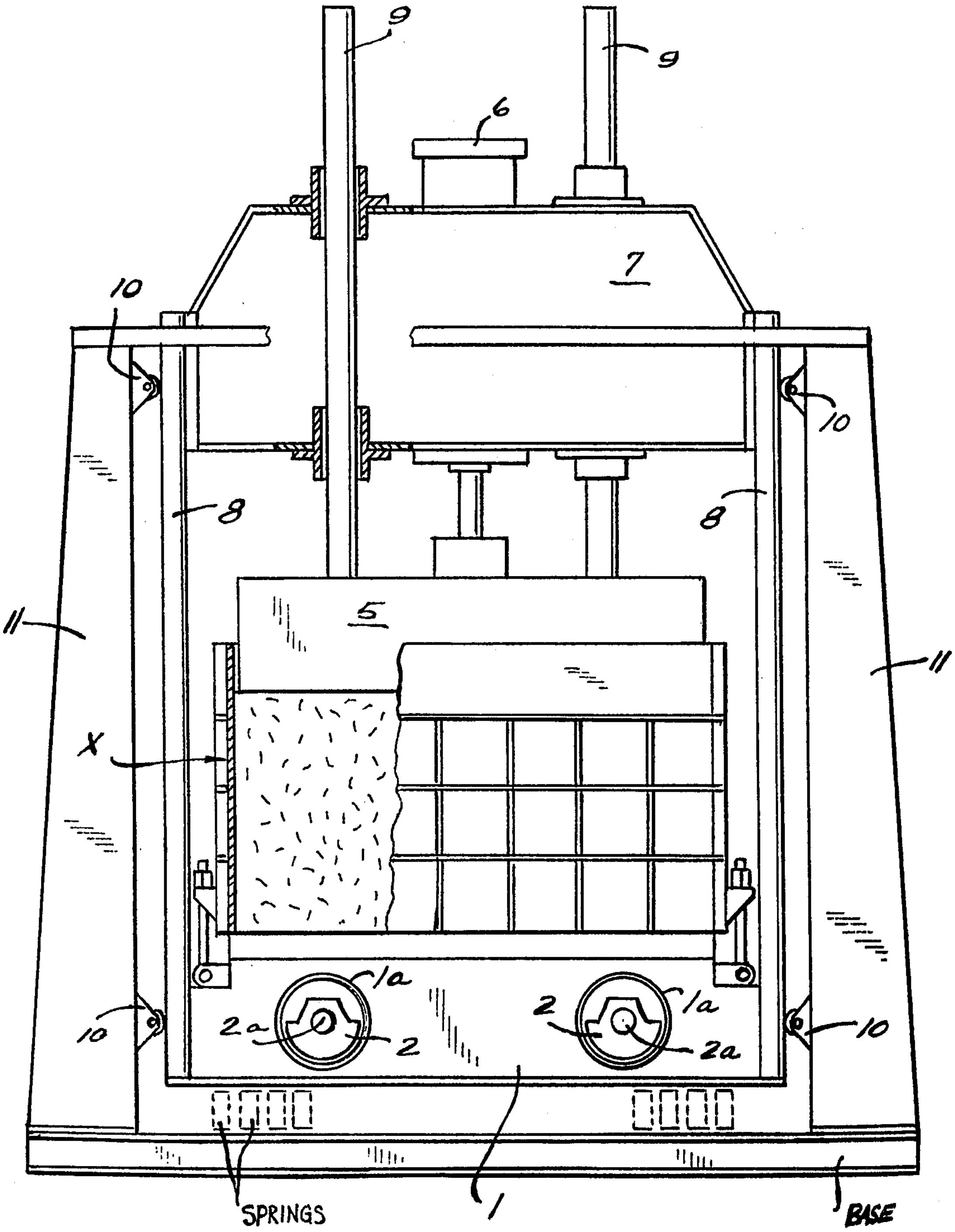
FIG. 1 is a somewhat diagrammatic front elevation of an apparatus for carrying out the present invention.
Figure 2:
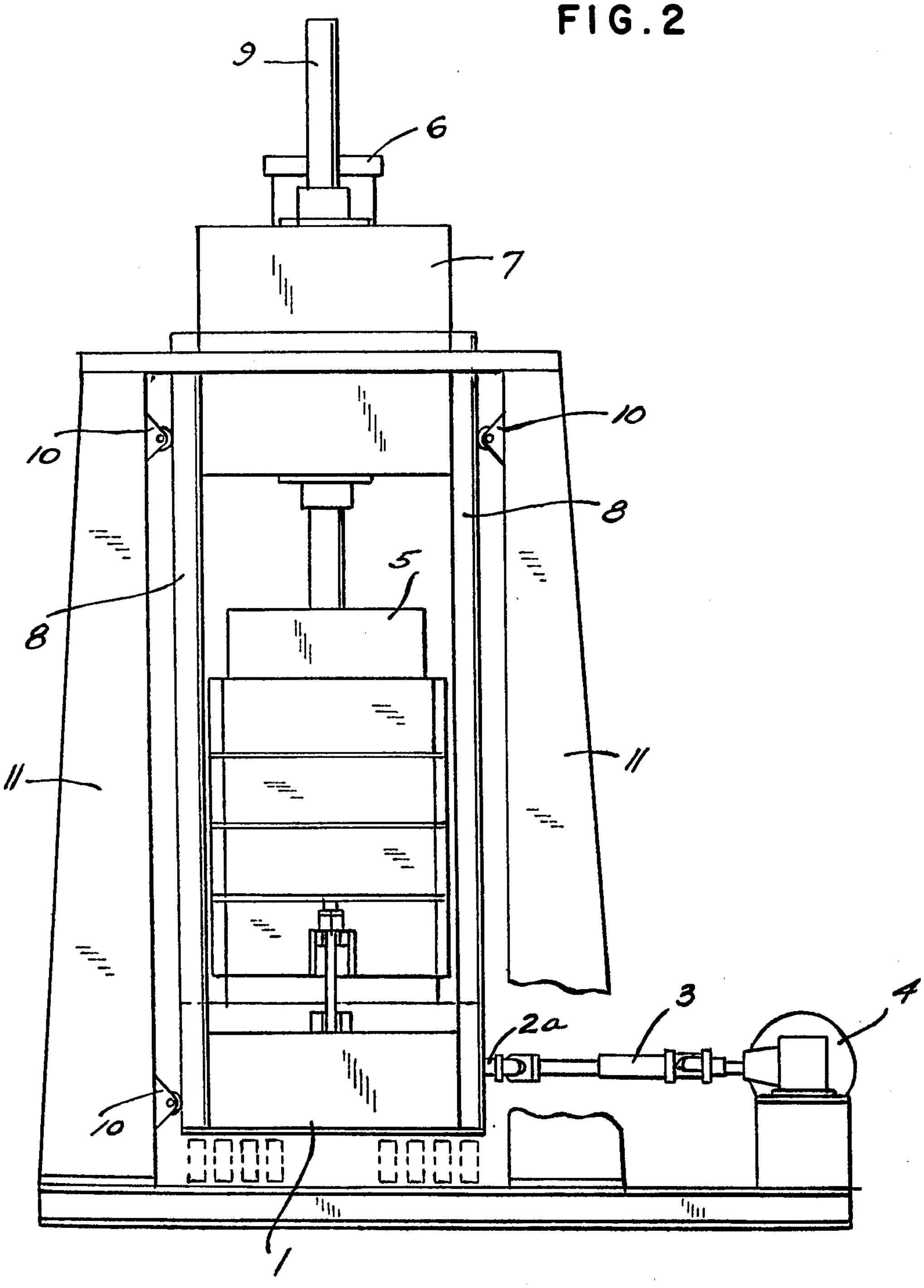
FIG. 2 is a side elevation of FIG. 1.

Discussing the drawing in detail, and firstly FIGS. 1 and 2 thereof, it will be seen that reference numeral 1 identifies a vibratory platform supported in "floating" condition via the diagrammatically illustrated springs on a base which is identified by a legend. The configuration of the platform is evident from a comparison of FIGS. 1 and 2, and mounted in the platform 1 are imbalanced masses in form of rotary bodies 2 located in the cavities 1*a* of the platform 1 and rotatable about their respective shafts 2*a*. The vibratory masses 2 will normally be rotated in mutually opposite directions. Evidently, the fact that these masses 2 are imbalanced will result in the imparting of vibratory stresses to the vibratory platform 1 when the masses 2 are so rotated.

In order to rotate the masses, rotary motion is transmitted to the shafts 2*a* by coupling the same via the articulated shafts 3 — clearly shown in FIG. 2 and conventional so that they require no detailed discussion — with a continuously variable drive, so as to permit continuous variation of the number of rotations of the shafts 3 and thereby of the shafts 2*a*. As illustrated the drive may be a hydrostatic drive 4 known per se to those skilled in the art and therefore not discussed in detail, but of course it may also be a conventional and well-known variable motor. What is essential in connection with the drive is only that it be continuously variable in order to permit continuous variation in the rotations of the shafts 3 and accordingly of the shafts 2*a*. Thus, the frequency of vibrations transmitted to the mold can be continuously increased as the material in the mold becomes progressively compacted.

A plate 5 is provided, constituting a weight and being so shaped as to be receivable through the open top of the mold — the latter being identified with a legend in FIG. 1, as is the material to be compacted and contained in the interior of the mold — and this way it rests on the granular mass located in the mold. It serves the dual purpose of treating the material and insuring that the upper surface of the finely produced coherent body — e.g., an electrode — would be smooth in accordance with the smooth underside of the plate 5. The latter is freely received in the open top of the mold.

A traverse 7 is located above the mold and connected with the vibratory platform 1 via the tie rods 8; traverse 7 supports a cylinder and piston arrangement 6 which is associated with the plate 5 and is able to impart stresses thereto in a sense pressing it deeper into the mold. This further serves to compress the granular mass contained therein. The arrangement 6 operates preferably either by compressed air or in an oil-hydraulic basis, and details containing these features need not be discussed because they are known per se and because of the construction of the arrangement does not in itself form a part of the invention.

To prevent the plat 5 from tilting with respect to the mold it is guided, and to assure that this guidance is always reliable, that is the plate 5 will not be able to tilt or cant, it is connected with guide rods 9 which are slidably supported in the traverse 7 as illustrated in FIG. 1, and which are so rigid as to resist bending under the stresses which occur.

Upright supports 11 are provided at opposite sides of the vibratory platform 1 and mounted on the illustrated place, it being understood that these supports 11 are entirely rigid. They are provided with guide rollers 10 (as shown in FIGS. 1 and 2) which engage the remainder of the apparatus in suitable manner, for instance as shown by engaging the members 8, in order to maintain the apparatus in predetermined relationship with respect to the uprights 8. This contributes to a quiet operation.

Figure 3:
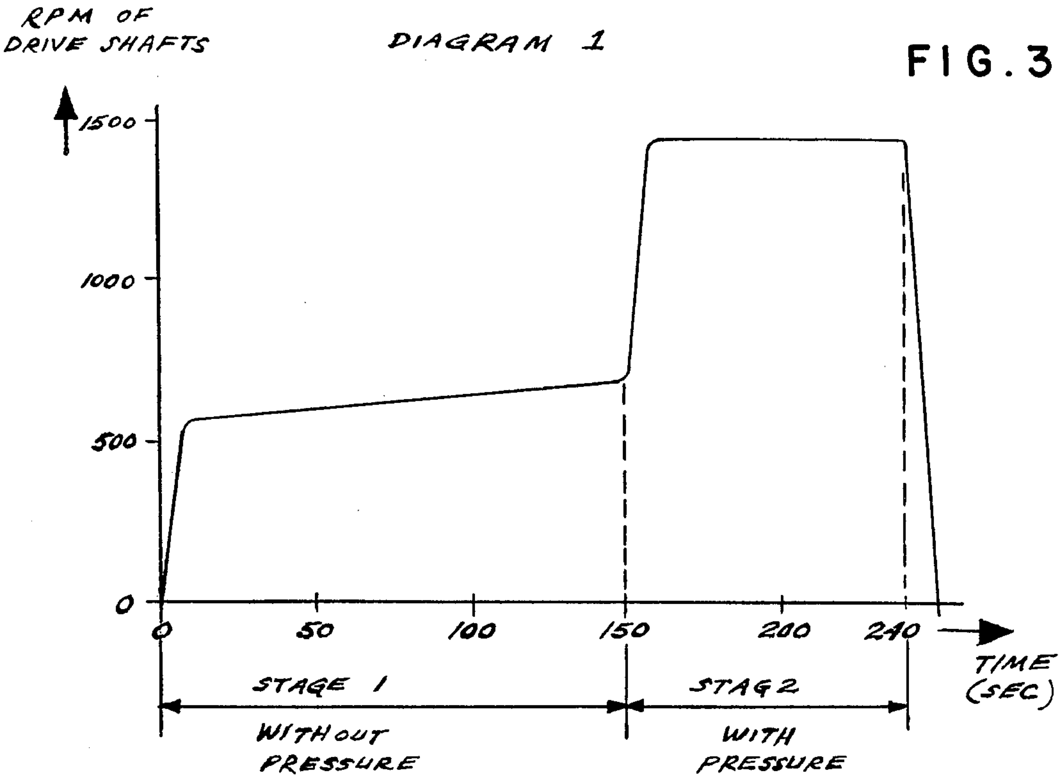
FIGS. 3 and 4 are diagrams illustrating graphically the operation of the invention and the exemplary production of coherent body from a quantity of granular mass.
Figure 4:
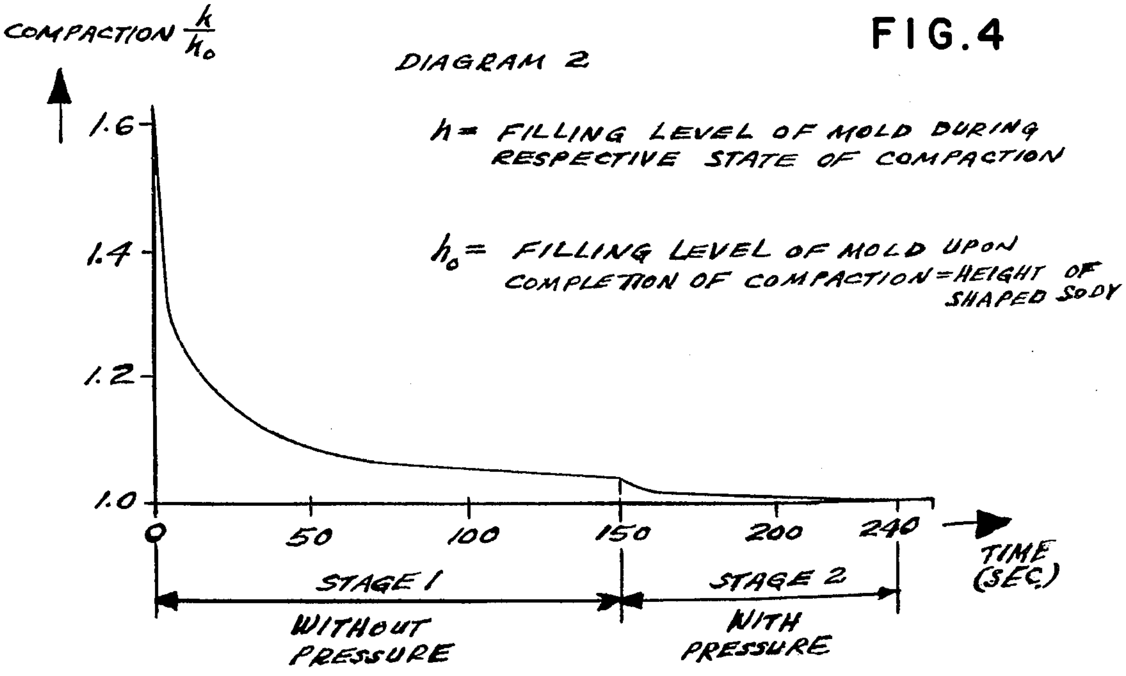

FIGS. 3 and 4 are diagrams illustrating the operation of the apparatus in the exemplary production of a body having a weight of approximately 1 ton from a granular mass. The mold is filled with the requisite quantity of granular mass at a location remote from the apparatus and is introduced to the position which it assumes in FIGS. 1 and 2 by being moved in the direction of the arrow X (see FIG. 1). For purposes of the invention is immaterial how this filling and moving is accomplished.

When the mold is in place the cover plate 5 is made to descend until it rests freely on the granular mass contained in the mold, and thereupon the drive 4 is started to impart rotary motion to the imbalanced masses 2 via the shafts 2*a* thereof. The number of revolutions per minute for the imbalanced masses 2 is selected via the drive 4 in accordance with stage 1 of diagram 1, as shown in FIG. 3. It is emphasized that the curve shown in FIG. 3 has been experimentally determined in accordance with the resonance characteristics of the system involved. When the apparatus is operated in this manner it will produce a compaction of the granular mass which is in accordance with the curve shown in stage 1 of the diagram 2 of FIG. 4, and is obtained without any pressure upon the granular mass other than that exerted by the weight of the plate 5. Thus, it will be seen that compaction under these circumstances approaches a boarderline value after approximately 150 seconds.

At this time, and to further improve the density and homogeneity of the body which is to be produced by compacting of the granular mass, the cylinder and piston arrangement 6 of FIG. 1 is operated and exerts in the illustrated example of FIG. 3 and 4 a pressure of approximately 25 tons onto the plate 5. The rotations per minute of the imbalanced masses 2 are also increased at that time in accordance with stage 2 in diagram 1 of FIG. 3, and stage 2 in the diagram 2 of FIG. 4 shows that the result is additional compaction with a maximum value being reached after approximately 240 seconds, counting from the start-up of the apparatus.

It will be appreciated that various granular materials can be compacted in accordance with the method of the present invention, such materials including for instance oil coke, pitch coke, furnace coke, antreside and graphite. Masses to be compacted are composed of between substantially 70–82% of granules, such as coke or one of the other materials mentioned above, and between 18 and 30% of coal-tar pitch as a binder material. The coke or other materials listed above will have a grain size of up to substantially 20 mm. and a pouring weight 0.5 – 1.1 gram per cubic centimeter. The final density obtained is 1.56 -65 178 gr/cm$^3$ and the compacting time required is between 2 and 10 minutes depending upon the quantity of the material involved, the type of material, relative pressure and the vibratory frequency. The latter may be between 200 and 1,100 cycles per minute (rotations of the shafts 2*a* per minute) during the initial stage in which the granular material is subjected only to pressure by the inherent weight of the plate 5, but not to pressure exerted by the arrangement 6 and between 800–3,000 cycles per minute during the second stage during which additional pressure via the arrangement 6 is exerted.

As an example it is pointed out that for instance of 1 ton of a mixture having a pouring weight of approximately 0.7 grams/cm$^3$ may be intended to be compacted. This mixture may be comprised of about 80% of coke having a particle size up to 20mm. and about 20% of coal-tar pitch as a binder.

Such a mixture is loosely poured into the mold and the plate 5 is placed onto it through the open top of the mold. Thereafter, rotation is imparted to the vibratory masses 2 and the frequency of vibrations is continuously increased from for instance 500 to 1,500 cylces per minute, resulting in the compaction of the mixture into a homogeneous body having a final density of about 1.7 gr/cm$^3$.

It will be seen, therefore, that the present invention achieves the objectives outlined earlier and permits the production of coherent bodies (for instance electrodes) from granular material.

It will be understood that each of the elements described above, or two or more together, may also find a useful application in other types of constructions differing from the types described above.

While the invention has been illustrated and described as embodied in the production of coherent bodies from granular material, it is not intended to be limited to the details shown since various modifications and structural changes may be made without departing in any way from the spirit of the present invention.

Without further analysis, the foregoing will so fully reveal the gist of the present invention that others can, by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

We claim:

1. In a method from a granular mass which includes a viscous binder and granules of a carbon base material, the steps comprising providing a vibratory compacting device including a mold mounted for vibratory movement; confining said granular mass in said mold; resting a cover weight freely on top of said granular mass; vibrating said mold at a first frequency while said cover weight rests freely on said granular mass until partial compacting of said granular mass is effected; thereafter applying a substantial force to said cover weight to brace it against said partially compacted granular mass; and vibrating said mold at a second frequency substantially higher than said first frequency while said cover plate is braced against said granular mass.

2. A method according to claim 1 wherein said carbon base material comprises coke granules with a grain size less than 20 mm. and a pouring weight between 0.5 and 1.1 grams per cubic centimeter, and wherein said viscous binder comprises coal-tar pitch.

3. A method according to claim 2, wherein said coke granules comprise 70–82% of said granular mass, the remainder of said granular mass consisting essentially of said coal-tar pitch.

4. A method according to claim 1, wherein said first frequency is accommodated to the resonance characteristics of the granular mass.

5. A method according to claim 4, wherein said second, higher frequency is at least a multiple of said first frequency and is a function of the resonance characteristics of the vibrating system with said cover weight braced against said granular mass.

6. A method according to claim 5 wherein said first frequency is continuously increased as said material is compacted.

* * * * *